Nov. 7, 1939.    P. L. SCOTT    2,179,355
COUPLING
Filed Aug. 19, 1935
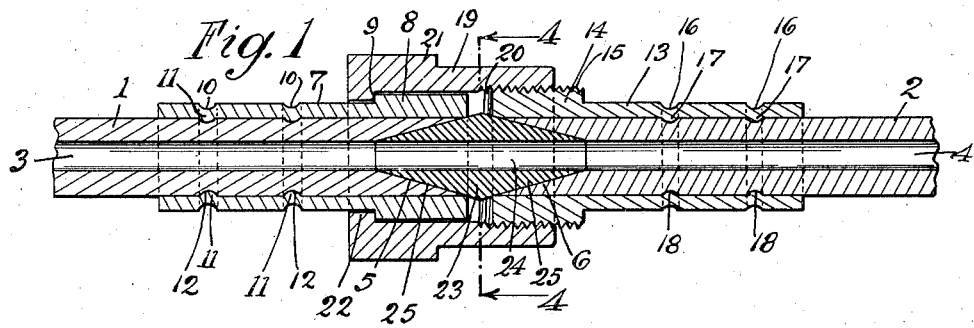
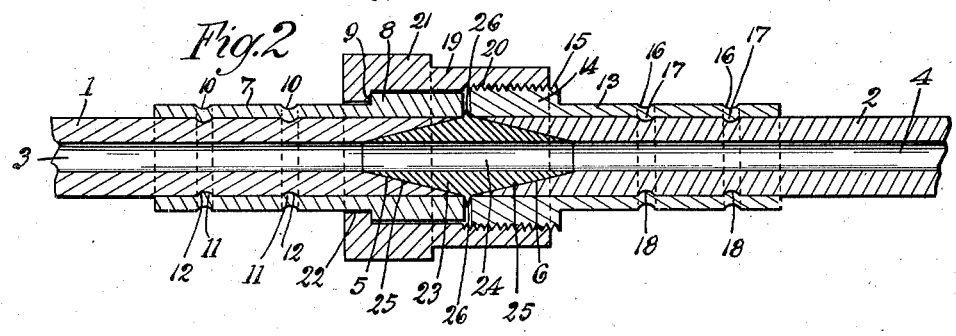
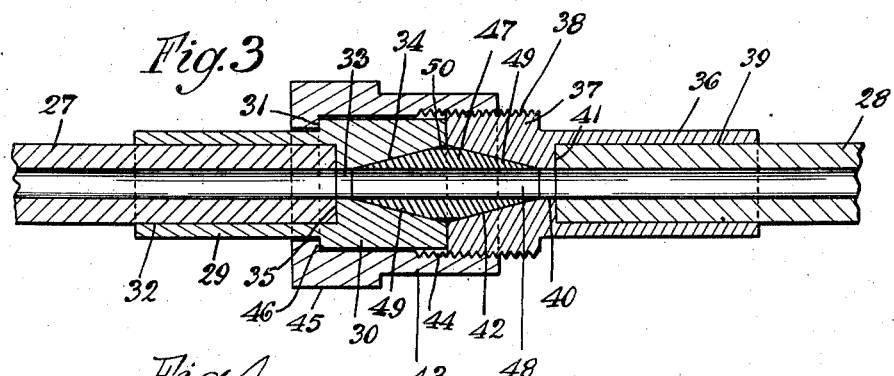
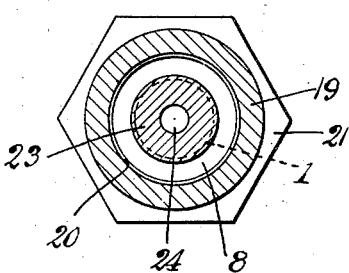
Inventor
Philip L. Scott
by Parker + Carter,
Attorneys.

Patented Nov. 7, 1939

2,179,355

UNITED STATES PATENT OFFICE 2,179,355

COUPLING

Philip Lane Scott, Chicago, Ill., assignor to Super Diesel Tractor Corporation, La Porte, Ind., a corporation of New York Application August 19, 1935, Serial No. 36,879

1 Claim. (Cl. 285—120)

This invention relates to a coupling and particularly to means for coupling together the ends of two portions of pipe or tubing.

One object of the invention is to provide a coupling of the type suggested in which great pressures and severe vibration or heavy structural loading upon the pipe may be withstood.

Another object is to provide a coupling of the type suggested, which is relatively light and small when compared to the sizes of the pipes which are to be connected. Another object is to provide a coupling in which there is a sealing means and in which the sealing means and the load carrying means are separate so that each performs but a single function.

Other objects will appear from time to time in the specification and claim.

My invention is illustrated more or less diagrammatically in the accompanying drawing, wherein:

Figure 1 is a cross section through the ends of pipes illustrating one form of my coupling before it is complete;

Figure 2 is a similar view showing the coupling completed;

Figure 3 is a similar section showing a modified form of coupling and

Figure 4 is a transverse cross section, taken at line 4—4 of Figure 1.

Like parts are designated by like characters throughout the specification and drawing.

1, 2 are tubes provided respectively with bores 3 and 4. The bore 3 of the tube 1 is preferably counter-bored or tapered outwardly at its end, as indicated as at 5. The bore 4 of the tubular member 2 is correspondingly preferably counter-bored or tapered outwardly as at 6.

Fastened to the tube 1 is an end member 7, which is preferably cylindrical in shape and is provided with an enlargement 8 which forms at one end a shoulder 9.

The member 7 may be fastened to the tube 1 in any suitable manner, for example, by soldering, welding or brazing. It may also be fastened in the manner shown in which one or more preferably annular depressions 10 are formed in the exterior of the cylindrical member 7. These depressions are preferably formed not so much by bending the entire cylindrical section of member 7, but by actual depressing of the metal and thus a corresponding, but smaller, inwardly projecting annular elevation 11, 11 is formed for each of the depressions 10. As this is formed, a corresponding depression 12 is formed in the exterior of the tube 1. This may be formed by a pushing aside of the metal of the tube towards its exterior rather than by the complete deformation of the tube, and thus the bore 3 of the tube 1 may be practically undisturbed and unaffected by the depression 12. To all intents and purposes this latter depression is normally formed in the exterior of the tube 1 without any appreciable effect upon the inner walls of the tube 1. It must be understood that the showing of the depressions and elevations just described is greatly exaggerated in the figures. Actually they are much smaller in proportion to the tube 1 and the member 7, but for purposes of illustration it was necessary to exaggerate them in the drawing.

Positioned upon and fastened to the end of the tube 4 is a member 13, preferably generally cylindrical in shape, provided at one end with an enlargement 14 which may be threaded exteriorly as at 15. Formed on the exterior of the member 13 is one or more depressions 16, which correspond to the depressions 10 in the member 7. Inward projections 17 are formed on the interior of the member 13 and the exterior of the tube 4 is correspondingly deformed as at 18. Thus I have shown the member 13 fastened to the tube 2 in the same manner as the member 7 is fastened to the tube 1, although, as in the case of the tube 1, the members 2 and 13 might be fastened together in any other way, such for example as soldering, brazing, welding or threading.

19 is a collar which is preferably interiorly threaded as at 20 and it may be provided with an enlarged portion 21 of angular cross section, as shown particularly in Figure 4. It is provided at one end with an inwardly facing angular flange 22 which engages the shoulder 9 of the member 8. The threaded portion 20 is adapted to engage the threaded portion 15 of the member 14.

23 is a thimble-like member which is provided with a central bore 24 and preferably having two symmetrically tapered exterior portions 25, 25. As shown in Figure 1, the joint is not complete and the parts have not yet been drawn together. As shown in Figure 2, they have been drawn together, and since the largest portion of the thimble 23 is of greater diameter than the bore in the members 8 and 14, it is pinched and compressed and a laterally extending flange 26 is thus formed integrally with the thimble 23 and extending between and engaged by the facing ends of the enlargements 8 and 14. It thus forms in effect a gasket at this point.

In the modified form shown in Figure 3, pipes or tubes 27, 28 appear. To the tube 27 is secured an end portion 29. This might be secured in any manner but as shown herewith it is brazed or soldered to the tube 27. This portion or member 29 is provided with an enlargement 30 which forms a shoulder 31. Within the member 29 is a bore 32 which communicates with a reduced bore 33 which will ordinarily be formed within the enlargement 30. The bore 33 is flared or tapered outwardly as at 34, and the shoulder 35 is formed between the main bore 32 and the reduced bore 33.

36 is a hollow member preferably cylindrical, provided with an enlargement 37 externally threaded as at 38. The member 36 has an interior bore 39 communicating with a reduced bore 40. 41 is a shoulder formed between the bores 39 and 40. The bore 40 is flared outwardly as at 42.

43 is a collar or locking means interiorly threaded as at 44. It may be provided as at 45 with an enlargement of angular cross section. It has an inwardly facing annular flange 46 which engages the shoulder 31 of the member 30.

47 is a thimble provided with a bore 48. It is preferably symmetrically exteriorly tapered as at 49, 49 and at its widest portion is flattened as at 50.

It will be realized that whereas I have herewith shown and described a practical operative device, nevertheless many changes might be made in the size, shape, number and disposition of parts without departing from the spirit of the invention and I wish, therefore, that my showing and description be taken as in a sense diagrammatic.

The use and operation of my invention are as follows:

When two portions of tube or pipe are to be connected, end members such as the members 7 and 13 are positioned on the ends of the pipe and fastened thereto in any suitable manner, either as shown in Figures 1 and 2 or by soldering, brazing, welding or otherwise, so that the end members are securely and permanently fixed to the pipe sections. In the form of the invention shown in the first two figures, the interior of the pipe bore is then enlarged to provide the tapered sections 5 and 6, which preferably are countered-bored outwardly and end at the outer end of the members 8 and 14 and thus the pipe sections and the end members terminate at about the same point. A generally tubular thimble shaped member, such as the member 23 or its equivalent, which is preferably of relatively ductile material, for example, brass, is inserted entially in the end of each tube, and the collar member 19, which is in position on the member 7, is moved to engage the threads of the member 14 and the parts are drawn together. As shown in Figure 1, they are partially drawn together and the coupling is not complete. As shown in Figure 2 the coupling or joint is complete and the end members 8 and 14 have been drawn towards each other from the position shown in Figure 1. As this is done, a portion of the thimble which extends outwardly, has been compressed or pinched outwardly to form the laterally extending flange 26 which is caught between the corners of the members 8 and 14, as at 26, and thus in effect a gasket is formed at this point. When pressure is applied within the tube, the thimble is subject to the pressure and is thus so far as possible further expanded and its exterior is thus forcibly driven against the tapered portions of the bores 2, 3 and the greater the pressure within the system the greater the force driving or holding the thimble against the tapered portion of the bores and thus the greater the force preventing leakage in the joint resulting as shown in Figure 2, the load of the pressure is carried, not by the sealing thimble 23 but by the end members 10 and 13, and the collar 19. Only a very small portion of the sealing thimble 23 is unsupported and that is preferably its thickest and strongest portion. It thus has substantially only a single function, namely, that of sealing to prevent leakage and thus the load is carried by parts other than the sealing part.

In the form shown in Figure 3, the ends of the tubes are not flared or otherwise changed as to shape. There is fastened upon each of them a fitting 29 or 36, which surrounds the ends of the tubes and which furnishes an abutment or shoulder against which the end of the tube rests. In the form shown in this figure the tubes are soldered, brazed or welded to the members 29 or 36 so that they are permanently attached to them. The thimble 47 is generally similar to the thimble 23 in shape, but is preferably flattened about its widest diameter so that for a portion of its length it is out of contact with the flared bore of the members 30 and 37. The proportions of the parts are such that the collar 43 may draw the abutting end faces of the members 30 and 37 into contact with each other. Thus the thimble 47 is entirely surrounded and may be entirely supported so that it carries none of the load of pressure within and performs only a sealing action, the members 30 and 37 carrying the entire load and, therefore, furnishing the supporting effect.

In both forms of the invention the thin or feather edge of the ends of the thimble provide a means which responds readily to pressure from within and thus yields to form a sealing contact with the supporting parts, automatically and proportionately to the pressure. The bore of the thimble itself is of the same diameter as the bore of the tubes and thus there is provided a sealing means which co-operates in providing a uniform bore throughout the system, and in which depressions, pockets, constrictions or enlargements so common in known types of couplings are avoided.

I claim:

In combination in a coupling, a pair of pipe ends, each pipe having its bore conically counterbored towards its end, and a fastening and reinforcing member permanently positioned about the end of each pipe, an engaging member engaging each of said fastening members and adapted to be manipulated to draw and hold them together, the bores of the pipes being the same, and a sealing member of a relatively more yielding material than that of the pipes provided with an interior bore substantially the same as that of the pipes and tapered on its exterior from its center outwardly to provide substantially a feather edge at each end and adapted to expand outwardly under the influence of internal pressure to form a seal, the engaging means, when it is manipulated to draw the end members together, compressing and forming an outwardly extending flange on the sealing member, which flange lies between the abutting end surfaces of the end members.

PHILIP LANE SCOTT.